(12) United States Patent
Meng et al.

(10) Patent No.: US 7,698,527 B2
(45) Date of Patent: Apr. 13, 2010

(54) SELECTIVELY SUPPORTING DIFFERENT MEMORY TECHNOLOGIES ON A SINGLE MOTHERBOARD

(75) Inventors: Terence Chin Kee Meng, Penang (MY); Yong Yean Sun, Penang (MY); Ng Kay Ming, Penang (MY)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 11/724,396

(22) Filed: Mar. 15, 2007

(65) Prior Publication Data

US 2008/0225499 A1    Sep. 18, 2008

(51) Int. Cl.
G06F 12/00 (2006.01)
G06F 13/00 (2006.01)
G06F 13/28 (2006.01)
G06F 3/00 (2006.01)
G06F 1/00 (2006.01)

(52) U.S. Cl. .................. 711/170; 711/100; 710/11; 710/100; 710/104; 713/300

(58) Field of Classification Search ............... None
See application file for complete search history.

(56) References Cited

U.S. PATENT DOCUMENTS

| | | | |
|---|---|---|---|
| 6,681,271 B2 * | 1/2004 | Chih-Hung et al. | 710/43 |
| 6,904,506 B2 * | 6/2005 | Wu et al. | 711/170 |
| 2002/0144166 A1 * | 10/2002 | Chang et al. | 713/320 |
| 2005/0038956 A1 * | 2/2005 | Yeh et al. | 711/103 |

* cited by examiner

Primary Examiner—Matt Kim
Assistant Examiner—Ralph A Verderamo, III
(74) Attorney, Agent, or Firm—Trop, Pruner & Hu, P.C.

(57) ABSTRACT

A motherboard may be adapted to selectively implement one of two different memory technologies. For example, the motherboard may be able to subsequently implement a subsequently developed memory technology. In some embodiments, the motherboard is capable of detecting whether a memory module is in a slot dedicated to a first or a second memory technology and, based on the presence of a memory module in an appropriate slot, the motherboard may be adapted to operate with the particular, selected memory technology.

18 Claims, 2 Drawing Sheets

SELECTIVELY SUPPORTING DIFFERENT MEMORY TECHNOLOGIES ON A SINGLE MOTHERBOARD

BACKGROUND

This relates generally to motherboards used in processor-based systems.

A motherboard may provide basic components of a computer system, including a processor and memory. Currently, many motherboards include the double data rate two synchronous dynamic random access memory (DDR2 SDRAM) on board. The DDR2 memory comes in particular package types and particular densities. Generally, the DDR2 memories have a maximum density of 4 gigabytes. They have data rates from 400 to 1066 megabytes per second, per pin. They have supply voltages of about 1.8 volts and have specific packaging types. Thus, a motherboard adapted for DDR2 memories generally is not amenable to handling other memory technologies.

DETAILED DESCRIPTION

Figure 1:
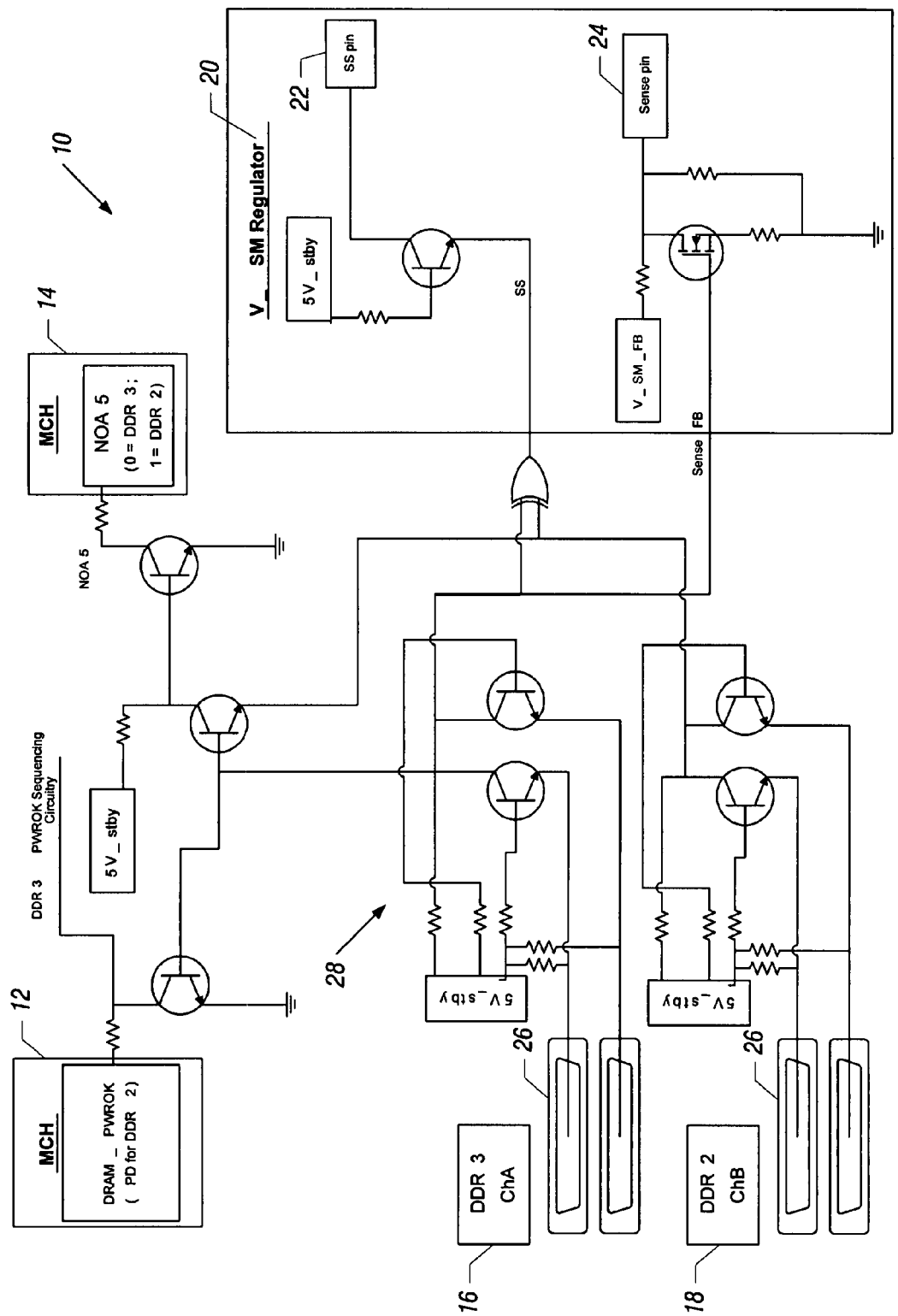
FIG. 1 is a circuit schematic for one embodiment of the present invention.

In accordance with one embodiment of the present invention, a motherboard 10, shown in FIG. 1, may be adaptable to selectively implementing one of at least two different memory technologies. For example, the motherboard 10 may implement a double data rate synchronous dynamic random access memory (SDRAM) that is either of the type two (DDR2) or type three (DDR3). However, other possibilities exist as well. In this case, the motherboard may be manufactured and distributed with the capability of being upgraded from DDR2 to DDR3 memory in one embodiment.

The DDR3 memory generally requires support circuitry which is different from that used by DDR2. The reasons for this include the higher density of DDR2, the different supply voltages, the different data rates, and the different packaging arrangements.

As shown in FIG. 1, channel A 16 may include a number of slots 26 that receive DDR3 memories and channel B 18 may include a number of slots 26 that receive DDR2 memories. Detection circuit 28 detects the presence of a dual inline memory module (DIMM) in a slot 26 in either channel A or channel B and, thereby, cause the system to adapt to the particular type of memory being utilized.

In particular, the memory controller hub pin 12 may be activated to control different memory technologies. The detection circuit 28 asserts the proper chipset straps and redirect necessary signals from the memory controller hub pin 12 to run either in the DDR3 or DDR2 mode. The circuit 28 may also configure the voltage regulator 20 to output the correct voltage levels, either 1.5 volts for DDR3 or 1.8 volts for DDR2.

While an embodiment is described in which DDR2 or DDR3 is selectively enabled, the present invention is not so limited and may be applied to selectively implementing one of at least two different memory technologies.

If both DDR2 and DDR3 DIMMs are detected in slots 26, the detection circuit 28 disables the output power to the memory dual inline memory modules and/or disables the memory controller hub 14 to prevent permanent damage. This would correspond to a mistaken situation where the user inserts both technology types.

The circuit 28 operates with dual NPN bipolar junction transistors to work as logic NOR gates in one embodiment. The key function of the circuitry is to detect the presence of the dual in line memory modules in the connectors 26. If one or both of the slots are populated, the output of the dual bipolar junction NPN transistors will be low. If no dual in line memory modules are detected, the output will remain high. Thus, depending on whether the modules are detected in the slots for DDR3 or the slots DDR2, the appropriate controls may be taken care of.

The memory controller hub pins 12 and 14 may be pins on the same memory controller hub. The pin 12 is an input signal that allows the memory controller hub to track the status of the V_SM power plane. Once a high signal is received, the memory controller hub deasserts a DRAM_RST signal and the DDR3 initialization begins. For DDR2, the pin may be shorted to ground. The pin NOA5 is the one that determines whether there is a DDR2 or a DDR3. It receives a zero for DDR3 and a one for DDR2 in one embodiment.

Figure 2:
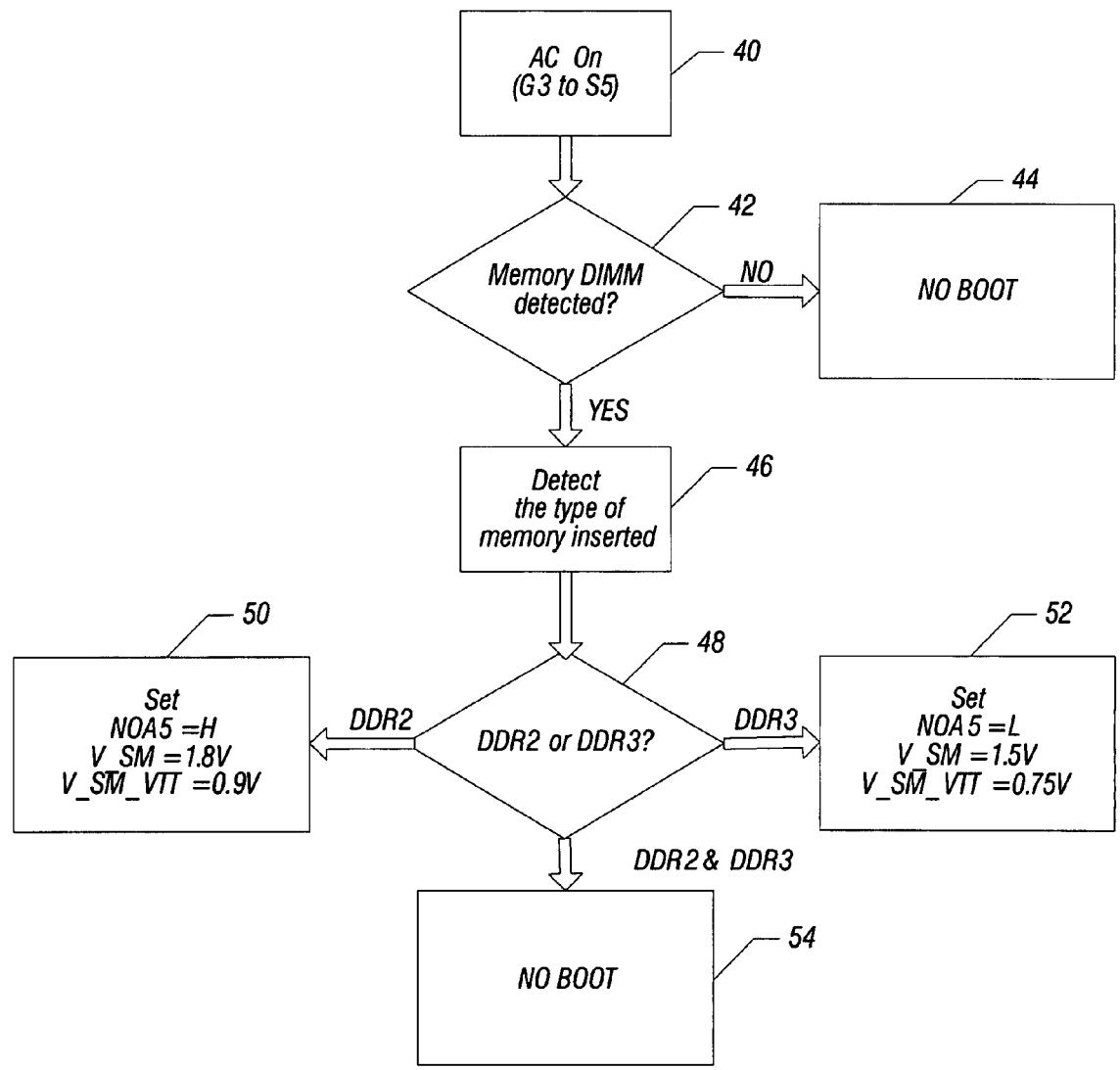
FIG. 2 is a flow chart for the embodiment shown in FIG. 1.

Referring to FIG. 2, a check at block 40 determines whether the system is on. Then a check at diamond 42 determines whether the circuit 28 has detected a dual inline memory module in one of the sockets 26. If not, the system does not boot, as indicated in block 44. An onboard speaker beeps when the end user powers on the board without memory in one embodiment.

If a dual inline memory module is detected at diamond 42, then a check at block 46 detects the type of memory inserted. At diamond 48, it is determined whether, in one embodiment, the memory inserted is DDR2 or DDR3. If it is DDR2, then, in block 50, NOA5 in the memory controller hub 14 is set equal to H or high Z stage, V_SM is set equal to 1.8 volts in the voltage regulator 20, and the standard on board voltage regulator V_SM_VTT (not shown) is set equal to 0.9 volts. The regulator V_SM_VTT is set to halve the output of the regulator 20. Thus, the voltage regulator 20 supplies the 1.8 volt supply used by DDR2.

Conversely, if DDR3 was detected, then, in block 52, NOA5 is set equal to L for low V_SM is set equal to 1.5 volts so that the voltage regulator 20 applies the appropriate voltage for DDR3, and V_SM_VTT is set equal to 0.75 volts. In the case where both DDR2 and DDR3 are detected, then, as indicated in block 54, no boot is allowed.

The detection circuitry 28 works as follows. If the slots in channel A and B are empty, then NOA5 is left floating, the sense FB is set equal to 1.5 volts and, SS is set equal to zero, as a result, the voltage regulator 20 is shutoff.

When a DDR2 DIMM is detected, then NOA5 is set equal to zero to turn off the memory controller hub, SS is set equal to the high Z state, and the sense FB is set equal to 1.5 volts so that the voltage regulator 20 outputs 1.5 volts for DDR3.

Conversely, if. DDR3 is one and DDR2 is zero, then NOA5 is equal to one, SS is in a high Z state, the sense FB voltage is 1.8 volts, and the voltage regulator outputs 1.8 volts for DDR2.

If both DDR3 and DDR2 are high, then NOA5 is set equal to the indeterminate state, SS is set equal to zero, sense FB is 1.8 volts, and the regulator is shutoff.

In summary, the output SS is set equal to ( $\overline{DDR2}*DDR3$ )+(DDR2* $\overline{DDR3}$ ), FB is set equal to the complement of DDR3 and NOA5 is equal to $\overline{DDR2}*DDR3$.

The pin NOA5 at the memory controller hub 14 is a memory controller strap for the DDR2, such that NOA5 equals one for DDR2 and zero for DDR3. The pin DRAM_P-

WROK at memory controller hub 12 goes high for DDR3, one microsecond after system memory voltage from the voltage regulator 20 is stable. For DDR2, this pin is unused and is tied to ground.

The SS pin 22 of the voltage regulator serves both as a system memory voltage regulator error amplifier output, as well as for compensation. By pulling this pin low, the voltage regulator output is disabled. The sense pin 24 on the voltage regulator 20 is used to sense the output voltage through a voltage divider and to regulate the output voltage accordingly.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing a motherboard with a slot for a first memory technology and a slot for a second memory technology;
   detecting a memory module in one of said slots;
   enabling a memory controller to be selectively adapted to one of two different memory technologies; and
   prohibiting a boot of said motherboard when a memory module of said first memory technology and a memory module of said second memory technology both are present in said slots.

2. The method of claim 1 including providing dedicated slots for each of the two different memory technologies.

3. The method of claim 2 including enabling the motherboard to detect when a memory module is placed in one of said slots.

4. The method of claim 1, wherein prohibiting said boot comprises disabling a circuit.

5. The method of claim 4, wherein disabling said circuit comprises disabling a voltage regulator on said motherboard.

6. The method of claim 5 including disabling a voltage regulator for said motherboard when neither of said slots have memory modules in them.

7. The method of claim 1 including providing a different supply voltage to said motherboard depending on the type of memory technology being used.

8. A motherboard comprising:
   a first slot for a first memory technology;
   a second slot for a second memory technology;
   a memory controller hub adaptable to one or the other of said memory technologies; and
   a circuit to prevent a boot of said motherboard when both a memory module of said first memory technology is present in said first slot and a memory module of said second memory technology is present in said second slot.

9. The motherboard of claim 8 wherein said first slot is a first dedicated slot to only receive a memory module of said first memory technology and said second slot is a second dedicated slot to only receive a memory module of said second memory technology.

10. The motherboard of claim 9 including a circuit to detect that a memory module is placed in one of said slots.

11. The motherboard of claim 10 including a memory controller, wherein said circuit to prevent said boot disables said memory controller when a memory module is placed in both of said slots.

12. The motherboard of claim 11 including a voltage regulator, wherein said circuit to prevent said boot disables said voltage regulator when a memory module is placed in both of said slots.

13. The motherboard of claim 12 wherein said voltage regulator is disabled when neither of said slots have memory modules in them.

14. The motherboard of claim 8 including a memory controller and a voltage regulator, said voltage regulator to supply a supply voltage to said memory controller depending on the type of memory technology being used.

15. A motherboard comprising:
   a first slot for a first memory technology;
   a second slot for a second memory technology, wherein said first slot is a first dedicated slot to only receive a memory module of said first memory technology and said second slot is a second dedicated slot to only receive a memory module of said second memory technology;
   a memory controller hub adaptable to one or the other of said memory technologies; and
   a voltage regulator, said voltage regulator to be disabled when a memory module of the first memory technology is present in the said first slot at the same time a memory module of the second memory technology is present in said second slot.

16. The motherboard of claim 15 including a circuit to detect that a memory module is placed in one of said slots.

17. The motherboard of claim 16 wherein said voltage regulator is disabled when neither of said slots have memory modules in them.

18. The motherboard of claim 15 including a memory controller, said voltage regulator to supply a supply voltage to said memory controller depending on the type of memory technology being used.

* * * * *